United States Patent
Hama et al.

(10) Patent No.: US 10,016,981 B2
(45) Date of Patent: Jul. 10, 2018

(54) AQUEOUS INK SET FOR INK JET RECORDING, RECORDING METHOD, AND INK JET RECORDING APPARATUS

(71) Applicant: Seiko Epson Corporation, Tokyo (JP)

(72) Inventors: Shintaro Hama, Shiojiri (JP); Ryosuke Teramoto, Matsumoto (JP); Yuho Miyake, Shiojiri (JP); Tetsuya Aoyama, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/602,458

(22) Filed: May 23, 2017

(65) Prior Publication Data

US 2018/0001643 A1   Jan. 4, 2018

(30) Foreign Application Priority Data

Jun. 30, 2016   (JP) .................................. 2016-130866

(51) Int. Cl.
| | |
|---|---|
| *B41J 2/165* | (2006.01) |
| *C09D 11/40* | (2014.01) |
| *C09D 11/033* | (2014.01) |
| *C09D 11/322* | (2014.01) |
| *C09D 11/328* | (2014.01) |
| *C09D 11/037* | (2014.01) |
| *C09D 11/30* | (2014.01) |
| *C09D 11/54* | (2014.01) |

(52) U.S. Cl.
CPC ......... *B41J 2/16505* (2013.01); *C09D 11/033* (2013.01); *C09D 11/037* (2013.01); *C09D 11/30* (2013.01); *C09D 11/322* (2013.01); *C09D 11/328* (2013.01); *C09D 11/40* (2013.01); *C09D 11/54* (2013.01)

(58) Field of Classification Search
CPC .. B41J 2/16505; C09D 11/033; C09D 11/037; C09D 11/30; C09D 11/322; C09D 11/328; C09D 11/40; C09D 11/54
See application file for complete search history.

(56) References Cited

U.S. PATENT DOCUMENTS

| | | | |
|---|---|---|---|
| 5,637,138 A | 6/1997 | Yamazaki | |
| 6,048,390 A * | 4/2000 | Yano | C09D 11/328 106/31.43 |
| 6,899,751 B2 * | 5/2005 | Arita | C09D 11/30 106/31.27 |
| 7,273,519 B2 * | 9/2007 | Taguchi | C09D 11/328 106/31.46 |
| 7,470,314 B2 * | 12/2008 | Valentini | C09D 11/38 106/31.28 |

(Continued)

FOREIGN PATENT DOCUMENTS

| | | |
|---|---|---|
| JP | 09-025441 A | 1/1997 |
| JP | 2004-339284 A | 12/2004 |

(Continued)

*Primary Examiner* — Anh T. N. Vo
(74) *Attorney, Agent, or Firm* — Harness, Dickey & Pierce, P.L.C.

(57) ABSTRACT

An aqueous ink set for ink jet recording includes an aqueous pigment ink containing water and a pigment as a coloring agent and an aqueous dye ink containing water and a dye as a coloring agent, in which the concentration of the divalent metal ions of the pigment ink is 10 ppm or more, and the potassium ion concentration of the dye ink is 50 ppm or less.

18 Claims, 3 Drawing Sheets

(56) References Cited

U.S. PATENT DOCUMENTS

| | | | |
|---|---|---|---|
| 7,883,184 B2 * | 2/2011 | Sugahara | B41J 2/005 347/55 |
| 2004/0227800 A1 | 11/2004 | Ohira et al. | |
| 2004/0233263 A1 | 11/2004 | Goto et al. | |
| 2005/0027035 A1 | 2/2005 | Wang et al. | |

FOREIGN PATENT DOCUMENTS

| | | |
|---|---|---|
| JP | 2004-346160 A | 12/2004 |
| JP | 2007-501291 A | 1/2007 |
| JP | 2012-148432 A | 8/2012 |

* cited by examiner

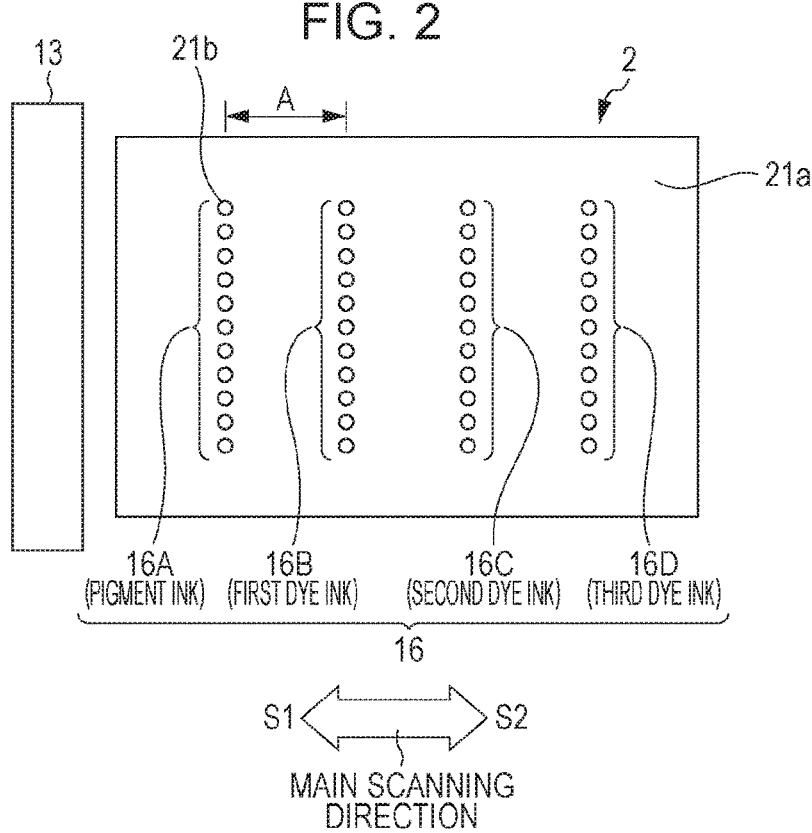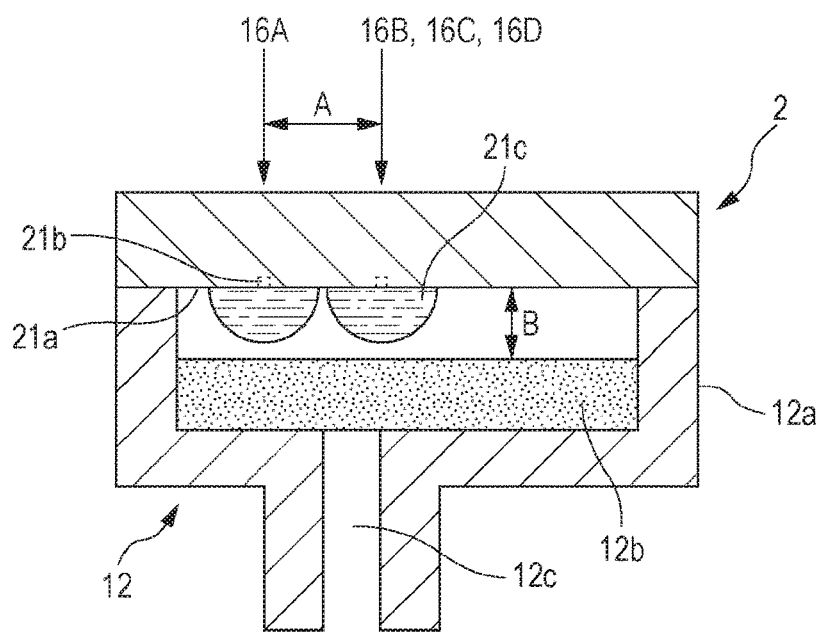

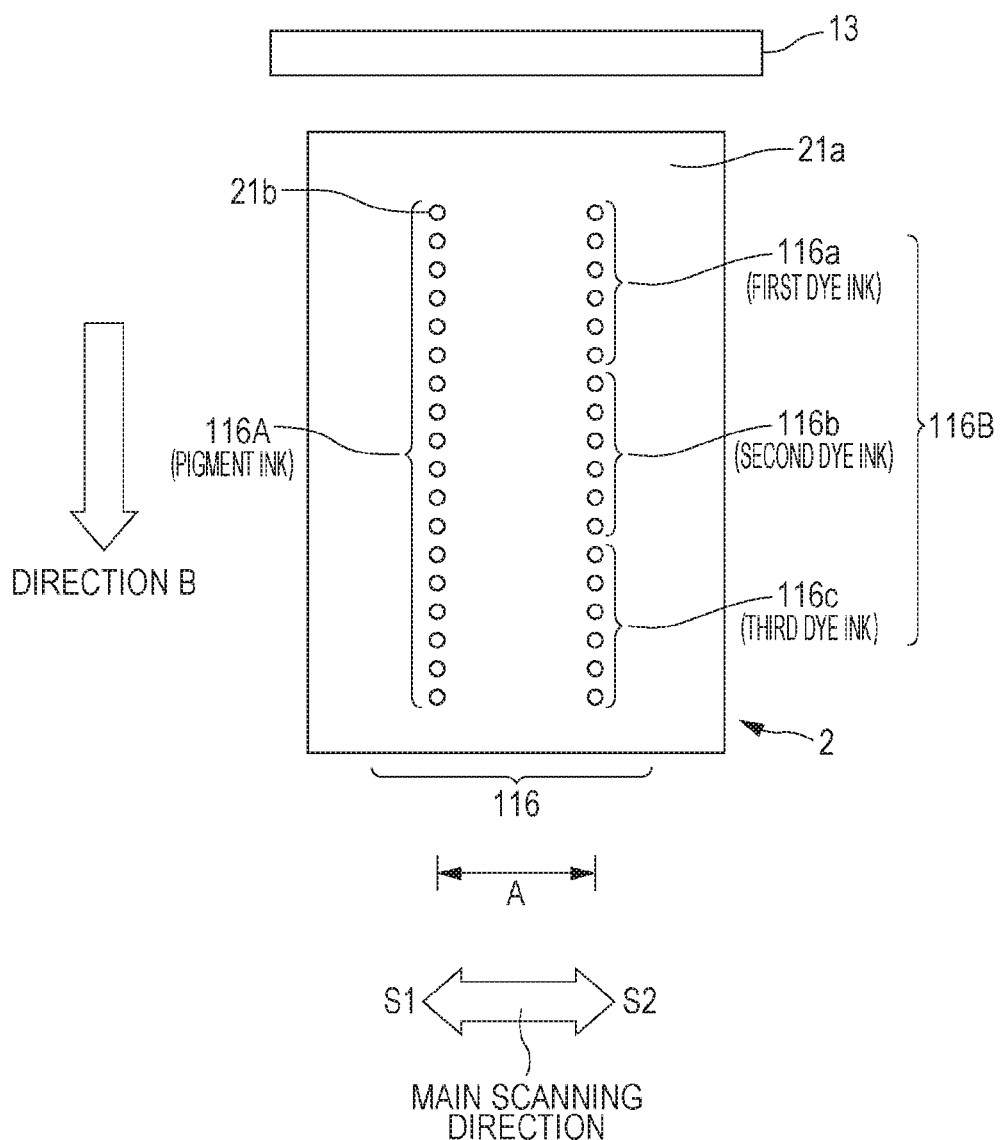

AQUEOUS INK SET FOR INK JET RECORDING, RECORDING METHOD, AND INK JET RECORDING APPARATUS

BACKGROUND

1. Technical Field

The present invention relates to an aqueous ink set for ink jet recording, a recording method, and an ink jet recording apparatus.

2. Related Art

Generally, there is known an ink containing a pigment or a dye as a coloring material. From the viewpoint that the pigment ink containing a pigment as a coloring material shows little bleeding and excellent water resistance and light fastness, the ink is preferably used for recording characters, images and the like on plain paper or recording paper having an ink receiving layer, especially for recording characters and the like on plain paper. In addition, from the viewpoint that the dye ink containing a dye as a coloring material has good glossiness and color developability and clear color, the ink is preferably used for recording characters, images and the like on plain paper or recording paper having an ink receiving layer, especially for recording images and the like on recording paper having an ink receiving layer.

Further, in recent years, the high integration of the nozzles has also been advanced along with the miniaturization of the ink jet recording apparatuses.

When the pigment ink and the dye ink having the above characteristics are used together, the recording quality of both characters and images recorded on the recording medium becomes excellent. For these reasons, recently liquid droplet jetting apparatuses having both of the pigment ink and the dye ink have been widely used. For example, an ink set composed of a combination of a black ink using a black pigment such as carbon black as a coloring material and a color ink using a dye as a coloring material is known. When printing is performed using such an ink set, the edges of the characters are sharp, the contrast is high, and the visibility of characters is excellent when printing character data mainly using black color. Since the color portion exhibits clear color when printing graphic data and the like, the visibility of the characters and the clarity of the color portion can be compatible with each other.

However, it is known that an ink set composed of a pigment ink using a pigment as a coloring material and a dye ink using a dye as a coloring material causes the counter ions of the dye in the dye ink to stop the dispersion of the pigment by bringing the pigment ink and the dye ink into contact with each other and mixing thereof, and thus the pigments are agglomerated.

When the pigment ink and the dye ink come into contact with each other in the nozzle, the pigments agglomerate in the nozzle to cause clogging of the nozzle or ejection failure. Further, when the pigment ink and dye ink come into contact with each other on the nozzle surface or the wiping member, the pigment agglomerates generated on the nozzle surface or the wiping member are transferred onto the nozzle surface to clog the nozzle hole, causing clogging and ejection failure by the wiping operation performed at the time of cleaning.

As a countermeasure for these, in order to prevent the dye and the pigment from being mixed with each other in the nozzle, the nozzle surface, the wiping member and the like, the printer head and the maintenance unit may be independently configured for the dye ink and the pigment ink, or the nozzle row arrangement may be configured to reduce the frequency that the dye ink and the pigment ink come into contact with each other by providing an interval between the dye ink nozzle and the pigment ink nozzle at the same head. However, in either case, there has been a problem that the size of the printer is increased and the manufacturing cost of the printer is increased.

There has been proposed an ink set for suppressing agglomeration of the pigment even when it is mounted on a low-cost ink jet recording apparatus of the related art (for example, see JP-A-2004-339284 and JP-A-2004-346160). In JP-A-2004-339284, it has been proposed that the pigment ink has a total ion concentration of potassium ions and sodium ions of 200 ppm or less and a total ion concentration of divalent or higher valent metal ions of 10 ppm or less. It has been proposed that the dye ink has a total ion concentration of potassium ions and sodium ions of 400 ppm or less and a total ion concentration of divalent or higher valent metal ions of 10 ppm or less. In JP-A-2004-346160, it has been proposed that the pigment ink has a total ion concentration of lithium ions, potassium ions and sodium ions of 60 ppm or more, and a total ion concentration of divalent or higher valent metal ions of 10 ppm or less. It has been proposed that the dye ink has a total ion concentration of lithium ions, potassium ions and sodium ions of 1800 ppm or less and a total ion concentration of the divalent or higher valent metal ions of 10 ppm or less.

However, in the ink set described in JP-A-2004-339284 and JP-A-2004-346160, since the ion concentration of the divalent metal ions contained in the pigment ink and the dye ink is limited to 10 ppm or less, when the content of the coloring material is to be increased, the ion concentration of the divalent metal ions is also relatively increased. Thus, it is forced to lower the concentration of the coloring material, and there is a problem in the color developability. Further, since the total amount of lithium ions, potassium ions and sodium ions, which are counter ions of the dye ink, is restricted, the water solubility of the coloring material tends to be lowered, so that there are problems such as degradation of color developability and deterioration of clogging recoverability.

Therefore, even when the pigment ink and the dye ink can be used together and are mounted on an ink jet recording apparatus having a low-cost and small maintenance unit and a head with highly integrated nozzles of the related art, there is a need for an ink set capable of suppressing agglomeration of the pigment and capable of satisfying excellent color developability, clogging recoverability, jetting stability accompanied by a cleaning operation and the like.

SUMMARY

An advantage of some aspects of the invention is to provide an aqueous ink set for ink jet recording, a recording method and an ink jet recording apparatus, in which the ink set is capable of suppressing agglomeration of the pigment due to mixing of an aqueous pigment ink and an aqueous dye ink and is excellent in color developability, excellent in clogging recoverability and excellent in jetting stability accompanied by a cleaning operation.

The present inventors have made intensive studies in order to solve the above-mentioned problems. As a result, it has been found that potassium ions in the counter ions of the dye of the aqueous dye ink are mainly a factor for destroying the dispersibility of the pigment in the aqueous pigment ink, and thus the invention has been accomplished.

According to an aspect of the invention, there is provided an aqueous ink set for ink jet recording including an aqueous pigment ink containing water and a pigment as a coloring agent, and an aqueous dye ink containing water and a dye as a coloring agent, in which the concentration of the divalent metal ions of the pigment ink is 10 ppm or more, and the potassium ion concentration of the dye ink is 50 ppm or less.

With the above configuration, when the potassium ion concentration of the dye ink is 50 ppm or less, agglomeration of the pigment can be suppressed when the pigment ink and the dye ink are mixed. When the potassium ion concentration is 50 ppm or less, the sodium ions or the lithium ions as the counter ions of the dye can be increased, so that the water solubility of the dye can be increased, the content of the dye in the dye ink can be increased, and the color developability can be increased. Accordingly, by setting the potassium ion concentration in the dye ink to 50 ppm or less, even in a case where the concentration of the divalent metal ions in the pigment ink is 10 ppm or more, the agglomeration of the pigments can be suppressed, the content of the pigments in the pigment ink can be increased and the color developability can be improved. In addition, it is possible to avoid clogging of nozzles due to agglomeration of pigments and satisfying jetting stability accompanied by a cleaning operation and the like, and thus separate maintenance units for the dye ink and the pigment ink may not be adopted. A maintenance unit of the related art can be used. Therefore, it is possible to realize an ink jet recording apparatus with reduced size and low cost.

Preferably, a total of the concentrations of lithium ions and sodium ions of the dye ink is 600 ppm or more. Accordingly, the water solubility of the dye can be improved and the content of the dye in the dye ink can be increased, so that the color developability can be improved. In addition, when the dye ink is dried and solidified, resolubility thereof in the ink is also improved, so that the clogging recoverability is improved. Furthermore, as the lithium ion concentration is increased, it is possible to suppress the bronze phenomenon (a phenomenon in which complicated and subtle colors resembling a metallic luster appear on the background color and are observed when the printed surface after drying is viewed from various angles).

Preferably, a yellow ink, a magenta ink, a cyan ink, and a black ink are further included. The black ink is composed of the pigment ink. The yellow ink, the magenta ink, and the cyan ink are composed of the dye ink. Accordingly, the recording quality of both characters and images recorded on the recording medium is excellent.

Preferably, the cyan ink contains one or more selected from the group consisting of coloring materials represented by the following Formula (C-1) and the following Formula (C-2). Accordingly, a cyan ink and further an ink set excellent in ozone resistance can be provided.

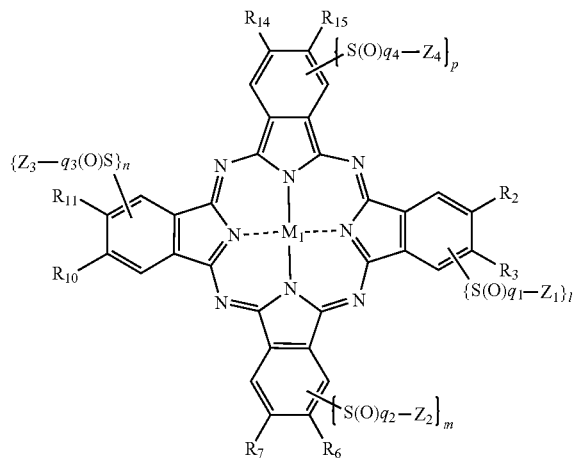

(C-1)

(In Formula (C-1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group or an ionic hydrophilic group. These groups may further have a substituent. $Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Provided that at least one of $Z_1$, $Z_2$, $Z_3$, and $Z_4$ has an ionic hydrophilic group as a substituent. l, m, n, p, $q_1$, $q_2$, $q_3$ and $q_4$ each independently represent 1 or 2. $M_1$ represents a hydrogen atom, a metal element, a metal oxide, a metal hydroxide or a metal halide.)

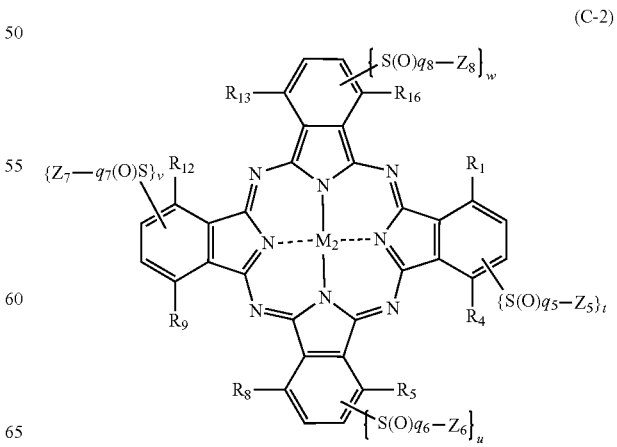

(C-2)

(In Formula (C-2), $R_1$, $R_4$, $R_5$, $R_8$, $R_9$, $R_{12}$, $R_{13}$ and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group or an ionic hydrophilic group. These groups may further have a substituent. $Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Provided that one or more of $Z_5$, $Z_6$, $Z_7$, and $Z_8$ has an ionic hydrophilic group as a substituent. t, u, v, w, $q_5$, $q_6$, $q_7$ and $q_8$ each independently represent 1 or 2. $M_2$ represents a hydrogen atom, a metal element, a metal oxide, a metal hydroxide or a metal halide.)

Preferably, the magenta ink contains one or more selected from the group consisting of coloring materials represented by the following Formula (M-1) and the following Formula (M-2). Accordingly, a magenta ink and further an ink set excellent in ozone resistance can be provided.

(In Formula (M-1-1), $R^{M1}$ represents a hydrogen atom or an alkyl group.)

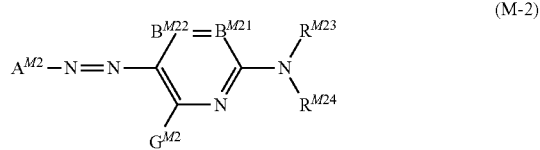
(M-2)

(In Formula (M-2), $A^{M2}$ represents a 5-membered heterocyclic group, $B^{M21}$ and $B^{M22}$ each represent —$CR^{M21}$=, —$CR^{M22}$=, or any one of $B^{M21}$ and $B^{M22}$ represents a nitrogen atom, and the other represents —$CR^{M21}$= or —$CR^{M22}$=, $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, $R^{M23}$, $R^{M24}$ may further have a substituent, $G^{M2}$, $R^{M21}$ and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a

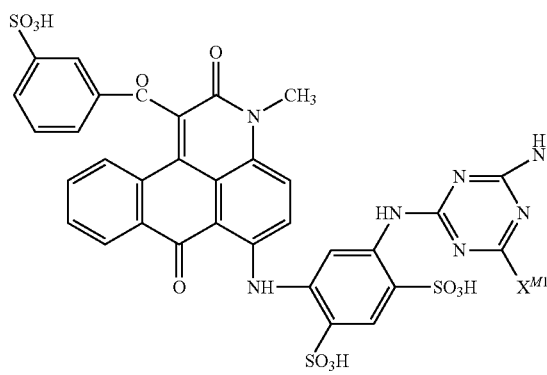
(M-1)

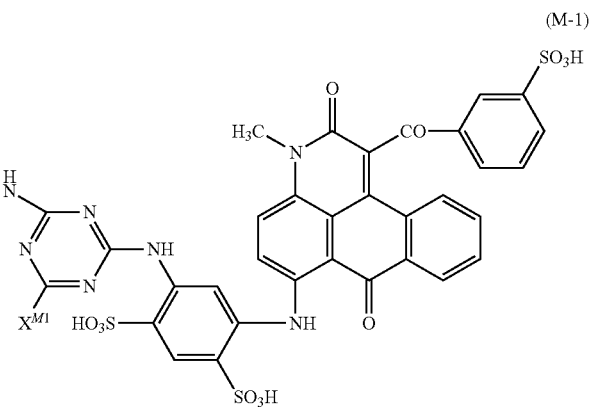

(In Formula (M-1), $A^{M1}$ represents an alkylene group having 1 or 2 carbon atoms, an alkylene group having 1 or 2 carbon atoms and containing a phenylene group or a group represented by the following Formula (M-1-1), and $X^{M1}$ represents an amino group, a hydroxyl group, a chlorine atom, or a phenoxy group substituted with a sulfo group or a carboxyl group.)

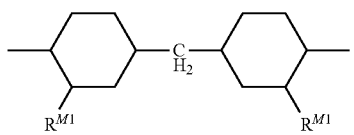
(M-1-1)

heterocyclic group, an acylamino group, a ureido group, a sulfamoylamino group, an alkoxycarbonylamino group, an aryloxycarbonylamino group, alkyl and arylsulfonylamino groups, an aryloxycarbonylamino group, a nitro group, alkyl and arylthio groups, alkyl and arylsulfonyl groups, alkyl and arylsulfinyl groups, a sulfamoyl group, a sulfo group, or a heterocyclic thio group, $G^{M2}$, $R^{M21}$, and $R^{M22}$ may be further substituted, and $R^{M21}$ and $R^{M23}$, or $R^{M23}$ and $R^{M24}$ may combine to form a 5- or 6-membered ring.)

Preferably, the yellow ink contains one or more selected from the group consisting of coloring materials represented by the following Formula (Y-1). Accordingly, a yellow ink and further an ink set excellent in ozone resistance can be provided.

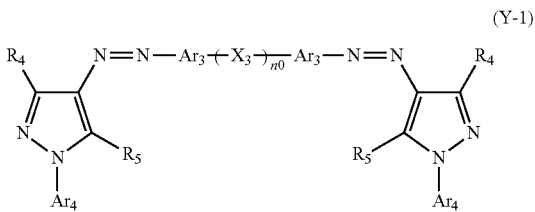

(Y-1)

(In Formula (Y-1), $R_4$ represents a substituent, $R_5$ represents —$OR_6$ or —$NHR_7$, $R_6$ and $R_7$ represent a hydrogen atom or a substituent, $X_3$ represents a divalent linking group, n0 is 0 or 1, $Ar_3$ represents a divalent heterocyclic group, and $Ar_4$ represents an alkyl group, an aryl group or a triazine group.)

According to another aspect of the invention, there is provided an ink jet recording apparatus including an ink set containing the above-described pigment ink and the dye ink; a nozzle surface provided with each of nozzle rows for jetting the pigment ink and the dye ink; and a cap member disposed close to the nozzle surface at the time of suction and having an ink absorbing material for sucking the ink from the nozzle row, in which when the interval between the nozzle row of the pigment ink and the nozzle row of the dye ink is A μm, and the distance between the nozzle surface and the ink absorbing material at the time of suction is B μm, the relation thereof satisfies A>B.

According to the above composition, in a case where the nozzle row of the pigment ink and the nozzle row of the dye ink are disposed close to each other, the pigment ink and the dye ink are mixed in the nozzle plate before the ink to be discharged from the nozzle is absorbed by the ink absorbing material at the time of suction by the cap member. However, agglomeration of the pigment can be suppressed. Therefore, it is possible to provide an ink jet recording apparatus capable of suppressing clogging and ejection failure with a simple maintenance unit even when the nozzle rows are highly integrated.

BRIEF DESCRIPTION OF THE DRAWINGS

The invention will be described with reference to the accompanying drawings, wherein like numbers reference like elements.

FIG. 2 is a schematic view showing an arrangement of nozzles provided in an ink jet head according to an embodiment of the invention.

FIG. 3 is a schematic view showing a positional relationship between a nozzle surface of the ink jet head and a cap member according to an embodiment of the invention.

FIG. 4 is a schematic view showing a modified example of an arrangement of nozzles provided in an ink jet head.

DESCRIPTION OF EXEMPLARY EMBODIMENTS

Figure 1:
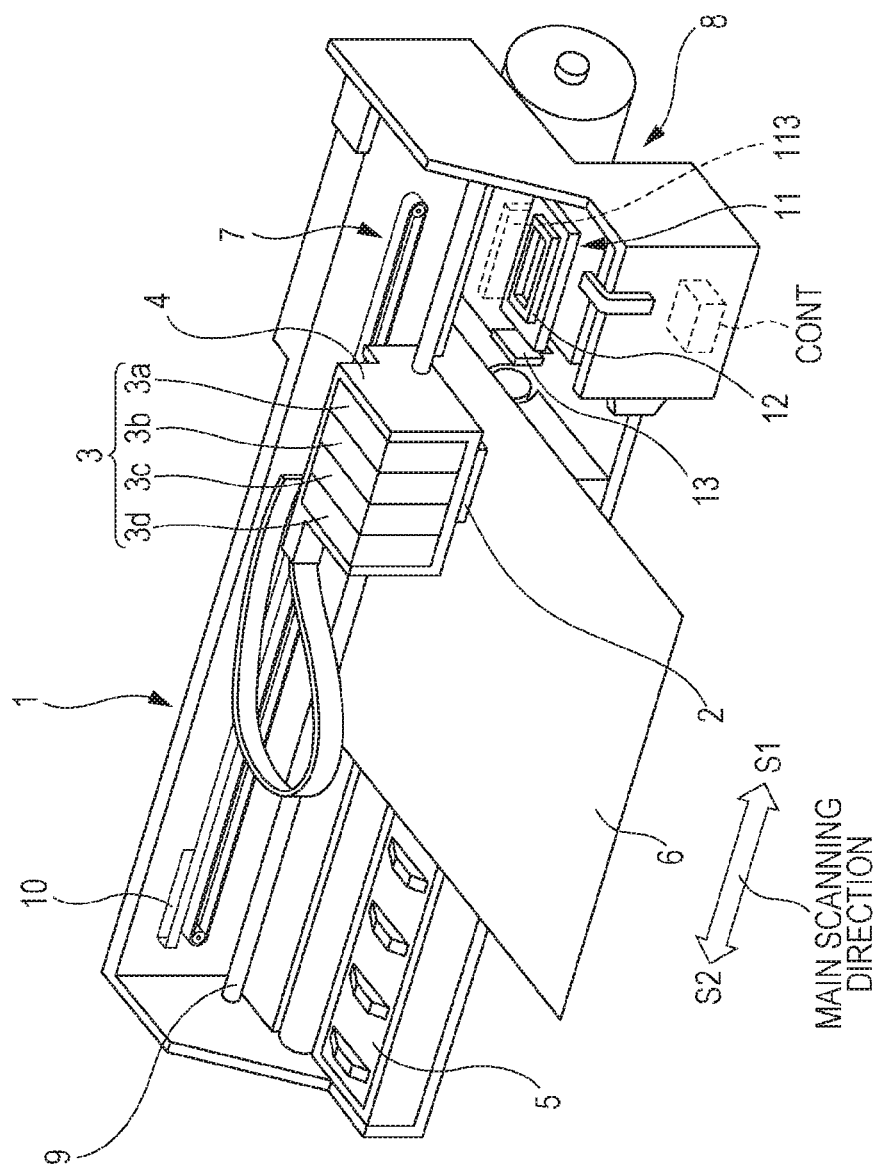
FIG. 1 is a perspective view showing a configuration of an ink jet apparatus according to an embodiment of the invention.

Hereinafter, embodiments for carrying out the invention will be described in detail. It should be noted that the invention is not limited to the following embodiments, and various modifications can be made within the scope of the gist of the invention.

1. Ink Set

An ink set according to an embodiment of the invention is an aqueous ink set for ink jet recording including an aqueous pigment ink containing water and a pigment as a coloring agent and an aqueous dye ink containing water and a dye as a coloring agent, in which the concentration of the divalent metal ions of the pigment ink is 10 ppm or more, and the potassium ion concentration of the dye ink is 50 ppm or less.

The inventors have found that potassium ions among the counter ions of the dye of the dye ink have an influence on the agglomeration of the pigment. Therefore, in the embodiment, agglomeration of the pigment can be suppressed when the pigment ink and the dye ink are mixed by specifying the potassium ion concentration of the dye ink to 50 ppm or less. Further, since sodium ions and lithium ions can be used as counter ions of the dye of the dye ink, the content of the dye in the dye ink can be increased, and the color developability can be improved. In addition, in accordance with the invention, since the concentration of the divalent metal ions of the pigment ink can be set to 10 ppm or more, the content of the pigment in the pigment ink can be increased and the color developability can be improved.

Preferably, the total concentration of lithium ions and sodium ions in the dye ink is 600 ppm or more. Accordingly, the content of the dye in the dye ink is increased, so that the color developability can be improved. In addition, since the number of counter ions of the dye in the dye ink is increased, the solubility of the dye can be maintained and clogging can be prevented. Further, as the lithium ion concentration is increased, the bronze phenomenon can be suppressed. Furthermore, preferably, the total concentration of lithium ions and sodium ions in the dye ink is 5000 ppm or less. Accordingly, this causes clogging of the head and clogging of the flow path filter, and it is possible to suppress the generation of fatty acid salts which are generated by the reaction with the fatty acid of the release agent contained in the plastic member and the like.

The ink set includes a yellow ink, a magenta ink, a cyan ink, and a black ink. Preferably, the black ink is composed of a pigment ink. The yellow ink, the magenta ink and the cyan ink are composed of a dye ink. When printing is performed using such an ink set and when printing character data mainly using black color, the edges of characters are sharp, the contrast is high, and the character visibility is excellent. When the graphic data is printed, since the color portion has clear color, the visibility of the character and the clarity of the color portion can be compatible with each other.

1.1. Pigment Ink

The pigment ink contains water and a pigment. Hereinafter, the components contained in the pigment ink will be described.

As the pigment, a known pigment can be used, but it is preferably a self-dispersion type pigment. The self-dispersion type pigment is a pigment that can be dispersed and/or dissolved in an aqueous medium without a dispersant. Here, "being dispersed and/or dissolved in an aqueous medium without a dispersant" refers to a state in which the pigment is stably present in the aqueous medium by the hydrophilic group on the surface without using a dispersant for dispersing the pigment. The use of a self-dispersion type pigment can reduce the amount of the dispersant used for dispersing the pigment, so that the foaming of the ink caused by the dispersant can be reduced, and an ink having excellent jetting stability can be easily prepared.

The self-dispersion type pigment can have a hydrophilic group on the surface of the pigment. The hydrophilic group on the surface of the pigment is preferably one or more hydrophilic groups selected from the group consisting of —OM, —COOM, —CO—, —$SO_3$M, —$SO_2$M, —$SO_2NH_2$, —$RSO_2$M, —$PO_3$HM, —$PO_3M_2$, —$SO_2$NHCOR, —$NH_3$, and —$NR_3$ (M in the formula represents a hydrogen atom, an alkali metal (for example, lithium, sodium, and potassium), ammonium, a phenyl group which may have a substituent, or an organic ammonium and R represents an alkyl group having 1 to 12 carbon atoms or a naphthyl group which may have a substituent).

The pigment used in the pigment ink according to this embodiment preferably has a metal salt structure. As described above, when the pigment ink has a metal salt structure, the dispersibility of the pigment is improved and the agglomeration of the pigment is less likely to occur.

The pigment is prepared by bonding (grafting) the hydrophilic group to the surface of the pigment, for example, by performing the physical treatment or chemical treatment. Examples of the physical treatment include a vacuum plasma treatment and the like. Examples of the chemical treatment include a wet oxidation method in which oxidation is carried out with an oxidizing agent in water, a method in which a carboxyl group is bonded through a phenyl group by bonding p-aminobenzoic acid to the surface of the pigment and the like.

It is preferable to use the pigment ink as a black color ink (hereinafter, also referred to as "pigment black ink"). In this case, it is preferable that the pigment be subjected to a surface treatment by an oxidation treatment with hypohalous acid and/or hypohalite, an oxidation treatment with ozone or an oxidation treatment with a persulfuric acid and/or a persulfate from the viewpoint of high color development.

Pigment inks may be used as color inks other than black (hereinafter, also referred to as "pigment color inks"). In this case, it is preferable that the pigments have high hydrophilic groups through the phenyl group on the surface thereof from the viewpoint of high color development. Various known surface treatment methods can be applied as a surface treatment method for bonding a hydrophilic group to the surface of a pigment through a phenyl group. A method in which sulfanilic acid, p-aminobenzoic acid, 4-aminosalicylic acid and the like are bonded to the surface of the pigment to bond the hydrophilic group through the phenyl group can be exemplified.

The pigment used in the pigment black ink is not particularly limited, but carbon black prepared by a known method such as a contact method, a furnace method, and a thermal method can be used. Preferred specific examples of the carbon black include: No. 2300, 900, MCF88, No. 20B, No. 33, No. 40, No. 45, No. 52, MA7, MA8, MA100, No2200B (which are manufactured by Mitsubishi Chemical Corporation), Color Black FW1, FW2, FW2V, FW18, FW200, 5150, 5160, 5170, PRETEX 35, U, V, 140U, Special Black 6, 5, 4A, 4, 250 (manufactured by Daicel Evonik Ltd.), Conductex SC, Raven 1255, 5750, 5250, 5000, 3500, 1255, 700 (which are manufactured by Columbia Carbon Co., Ltd.), REGAL 400R, 330R, 660R, Mogul L, Monarch 700, 800, 880, 900, 1000, 1100, 1300, 1400, ELFTEX 12, CAB-O-JET 300 (which are manufactured by Cabot Corporation) and the like. These carbon blacks may be used alone or as a mixture of two or more thereof.

The pigment used in the pigment color ink is not particularly limited, but in addition to pigments such as Pigment Yellow, Pigment Red, Pigment Violet, and Pigment Blue described in Color Index, pigments such as phthalocyanine type, azo type, anthraquinone type, azomethine type, and condensed ring type can be exemplified. Further, Organic pigments such as Orange No. 228 and No. 405, Blue No. 1 and No. 404, and inorganic pigments such as titanium oxide, zinc oxide, zirconium oxide, iron oxide, ultramarine blue, iron blue, and chromium oxide can be exemplified. Specifically, for example, C.I. Pigment Red 1, 3, 5, 8, 9, 16, 17, 19, 22, 38, and 57:1, 90, 112, 122, 123, 127, 144, 146, and 184; C.I. Pigment Violet 1, 3, 5:1, 16, 19, 23, and 38; C.I. Pigment Blue 1, 2, 15, 15:1, 15:2, 15:3, 15:4, and 16; and the like can be exemplified.

The content of the pigment is preferably 0.1% by mass or more and 20% by mass or less, more preferably 1% by mass or more and 20% by mass or less, and particularly preferably 1% by mass or more and 10% by mass or less with respect to the total mass of the pigment ink. When the amount is less than 0.1% by mass, the color developability of the recording medium having no ink receptive layer such as plain paper is inferior. When the amount is more than 20% by mass, the ink viscosity is increased, and the clogging recoverability may be deteriorated.

The pigment preferably has an average particle diameter in the range of 30 nm or more and 300 nm or less, more preferably 50 nm or more and 250 nm or less, and particularly preferably 50 nm or more and 200 nm or less from the viewpoints of storage stability of the ink and prevention of clogging of the nozzle. When the diameter is less than 30 nm, the pigment tends to be agglomerated and the storage stability of the ink may be deteriorated in some cases. When the diameter is more than 300 nm, sedimentation tends to occur and clogging recoverability may be deteriorated in some cases.

In the embodiment, the concentration of the divalent metal ions of the pigment ink is 10 ppm or more. It is preferably 15 ppm or more, and more preferably 20 ppm. The divalent metal ions are inevitably included in the process of producing the pigment, and when the content of the pigment is increased, the concentration of the divalent metal ions contained in the pigment ink is also increased. In the embodiment, when the potassium ion concentration of the dye ink is 50 ppm or less, pigment agglomeration can be suppressed even when the concentration of the divalent metal ions of the pigment ink is 10 ppm or more, that is, the content of the pigment of the pigment ink can be increased. Therefore, color developability can be improved.

Examples of the divalent metal ions include barium ion, magnesium ion, calcium ion, zinc ion, iron ion, copper ion, nickel ion, cobalt ion, manganese ion, lead ion, titanium ion and the like. The concentration of the divalent metal ions when the ink contains a plurality of the above divalent metal ions represents the sum of the concentrations of all the divalent metal ions contained.

Examples of the method for adjusting the ion concentration in the ink include a method of passing the ink through an ion exchange resin and a method disclosed in JP-A-9-25441, a method of adding a salt containing desired ions to the ink and the like, but the invention is not limited to these methods. In addition, each ion concentration of the ink can be measured by analysis using an ion chromatography and the like. In the present specification, ppm represents ppm on a mass basis.

The pigment ink contains water. Water functions as a main solvent for dispersing or dissolving the above-mentioned pigments.

It is preferable that the water be obtained by removing ionic impurities as much as possible, and examples thereof include pure water or ultrapure water such as ion exchanged water, ultrafiltered water, reverse osmosis water, and distilled water. In addition, the use of water sterilized by ultraviolet irradiation or addition of hydrogen peroxide is preferable because generation of fungus and bacteria can be prevented when the pigment dispersion and the ink using the pigment dispersion are stored for a long time.

The water contained in the pigment ink according to this embodiment is preferably 40% by mass or more, more preferably 50% by mass or more, and particularly preferably 60% by mass or more with respect to the total mass of the pigment ink. In the specification, the term "an aqueous pigment ink" refers to an ink containing 40% by mass or more of water with respect to the total mass of the pigment ink.

It is preferable that the pigment ink contain a water-soluble organic solvent. The above-mentioned water-soluble organic solvent is used for the main purpose of preventing precipitation from the ink at the tip portion of the ink jet head and preventing drying out. The water-soluble organic solvent is not particularly limited, but it is preferable that the solvent have low volatility and high dye solubility, and examples thereof include polyalkylene glycols such as polyethylene glycol; alkylene glycols such as ethylene glycol, propylene glycol, butylene glycol, diethylene glycol, dipropylene glycol, triethylene glycol, tripropylene glycol, 1,2, 6-hexanetriol, thiodiglycol, 1,3-butanediol, 1,5-pentanediol, and hexylene glycol; glycerin; Pyrrolidones such as 2-pyrrolidone and N-methyl-2-pyrrolidone. These water-soluble organic solvents may be used alone or in a combination of two or more.

The content of the water-soluble organic solvent is preferably 5 to 40% by mass. When the content is less than 5% by mass, the wetting action becomes insufficient and problems such as precipitation and dryness may occur. When the content is more than 40% by mass, problems such as a case in which the aqueous ink for ink jet recording of the invention thickens more than necessary so as to be difficult to be jetted, and a case in which the drying on the recording paper is extremely delayed may occur. More preferably, the content is 7 to 40% by mass, and still more preferably 10 to 35% by mass.

Further, According to the necessity for the purpose of controlling the permeability, a polyhydric alcohol monoalkyl ether may be used. The polyhydric alcohol monoalkyl ether effectively improves the penetration rate of the ink on the recording paper, thereby improving the quick drying property of the ink on the paper surface. The bleeding due to the slow drying property on the recording paper (boundary bleeding of other colors) or feathering due to penetration (whisker-like bleeding along the fiber of the paper) can be prevented. Examples of the polyhydric alcohol alkyl ether include diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, tripropylene glycol monobutyl ether and the like.

The content of the polyhydric alcohol alkyl ether is preferably 0.3 to 15% by mass. When the content is less than 0.3% by mass, the penetration rate of the ink on the recording paper is slow, so that problems of drying time and bleeding may occur. When the content is more than 15% by mass, the penetration rate of the ink on the recording paper becomes too fast, so that the aqueous ink for ink jet recording of the invention may reach the back side of the recording paper or cause bleeding. More preferably, the content is 0.5 to 10% by mass. It is also possible to use a monohydric alcohol such as ethanol and isopropyl alcohol for the purpose of controlling the permeability and dryness of the ink to the recording medium.

The basic constitution of the pigment ink is as described above, but it is possible to add other resin binders, dispersants, surfactants, viscosity adjusting agents, surface tension adjusting agents, pH adjusting agents, dye dissolving agents, antiseptic or antifungal agents, rust-preventive agent, and the like which are known in the related art as required.

1.2. Dye Ink

The dye ink according to this embodiment contains water and a dye.

The ink set according to this embodiment is not limited to using one type of dye inks, but may include plural kinds of dye inks. The plural types of dye inks are not particularly limited, and for example, dye inks having different colors from each other, dye inks having different saturation or lightness from each other and the like can be used. As the dye inks having different colors from each other, for example, dye inks having different kinds of dyes contained in the ink such as a cyan ink and a magenta ink can be mentioned. As the dye inks having different saturation or brightness from each other, dye inks having the same color of the dyes contained in the ink and different contents of the dyes in the ink such as cyan ink and light cyan ink can be mentioned.

Hereinafter, the components contained in the dye ink will be described. In addition, the dye ink may contain components other than the pigment among the components contained in the pigment ink described above. Therefore, description of components that can be commonly used in dye inks and pigment inks will be omitted.

In this embodiment, the potassium ion concentration of each dye ink is specified to 50 ppm or less. Accordingly, agglomeration of the pigment can be suppressed when the pigment inks and any of the dye inks are mixed. Further, since sodium ions and lithium ions can be used as counter ions of the dye of the dye ink, the content of the dye in the dye ink can be increased and the color developability can be improved. The potassium ion concentration of each dye is preferably 45 ppm or less, and more preferably 30 ppm or less.

Preferably, the total concentration of lithium ions and sodium ions of each dye ink is 600 ppm or more. The concentration is preferably 800 ppm or more, and more preferably 1000 ppm or more. Accordingly, since the content of the dye in each dye ink is increased, the color developability can be improved. In addition, since the counter ions of the dye in the dye ink are increased, the solubility of the dye can be maintained and clogging can be prevented. Furthermore, bronzing can be suppressed by increasing the lithium ion concentration.

As a method for adjusting the concentration of the counter ion (potassium ions, lithium ions, sodium ions) of the dye, a method of replacing the counter ions or adjusting (increasing) the amount of the ions can be improved. As a method of replacing the counter ions of the dye, a method using an ion exchange resin, a salting-out method of precipitating in which a salt containing ions such as sodium are added for precipitation and the like can be mentioned. Further, as a method of adjusting the amount of the ions, a method of adding lithium chloride, sodium chloride, potassium chloride and the like can also be mentioned.

When the ink set includes a yellow ink, a magenta ink, a cyan ink and a black ink, it is preferable that the yellow ink, the magenta ink and the cyan ink be composed of the dye ink. Accordingly, this results in an excellent recording quality of both characters and images recorded on the recording medium.

Dyes known in the related art may be used as the dyes. Examples of the dyes include various dyes used for ordinary ink jet recording such as direct dyes, acid dyes, edible dyes, basic dyes, reactive dyes, disperse dyes, vat dyes, soluble vat dyes, and reactive disperse dyes.

Preferably, a cyan ink contains one or more selected from the group consisting of coloring materials represented by the following Formula (C-1) and the following Formula (C-2).

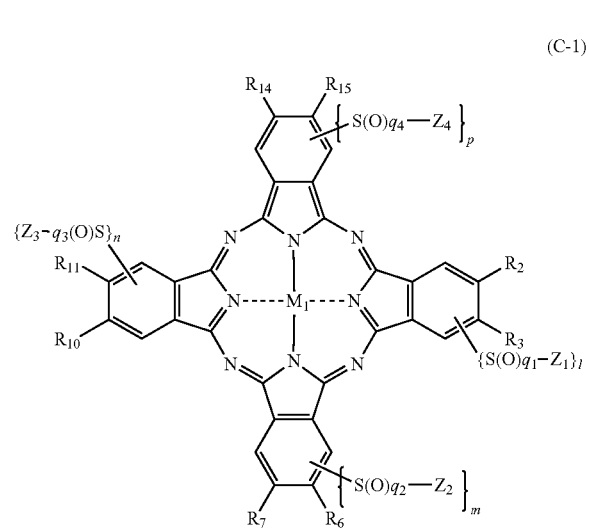

(C-1)

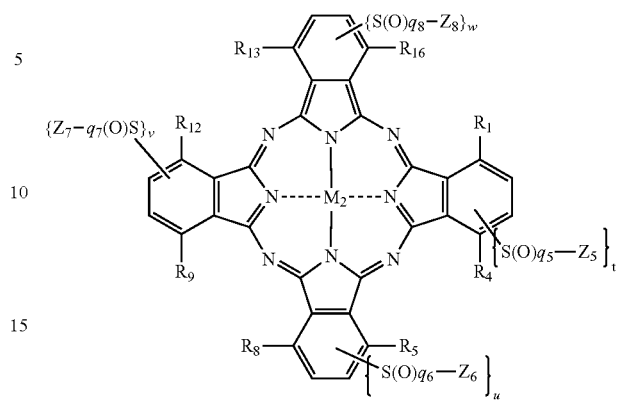

(C-2)

(In Formula (C-1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group or an ionic hydrophilic group. These groups may further have a substituent.

$Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Provided that at least one of $Z_1$, $Z_2$, $Z_3$, and $Z_4$ has an ionic hydrophilic group as a substituent.

l, m, n, p, $q_1$, $q_2$, $q_3$ and $q_4$ each independently represent 1 or 2.

$M_1$ represents a hydrogen atom, a metal element, a metal oxide, a metal hydroxide or a metal halide.)

(In Formula (C-2), $R_1$, $R_4$, $R_5$, $R_8$, $R_9$, $R_{12}$, $R_{13}$ and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group or an ionic hydrophilic group. These groups may further have a substituent.

$Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Provided that at least one of $Z_5$, $Z_6$, $Z_7$, and $Z_8$ has an ionic hydrophilic group as a substituent.

t, u, v, w, $q_5$, $q_6$, $q_7$ and $q_8$ each independently represent 1 or 2.

$M_2$ represents a hydrogen atom, a metal element, a metal oxide, a metal hydroxide or a metal halide.)

Preferably, a magenta ink contains one or more selected from the group consisting of coloring materials represented by the following Formula (M-1), and the following Formula (M-2).

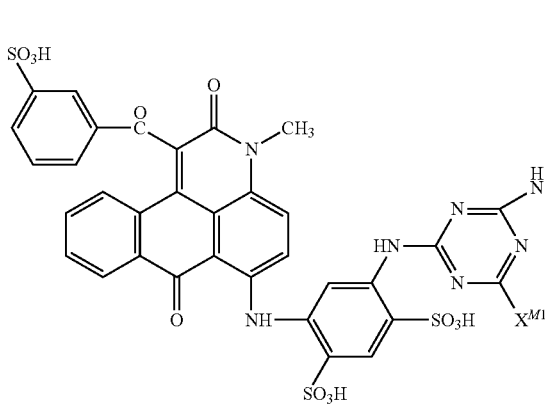

(M-1)

(In Formula (M-1), $A^{M1}$ represents an alkylene group having 1 or 2 carbon atoms, an alkylene group having 1 or 2 carbon atoms and containing a phenylene group or a group represented by the following Formula (M-1-1), and $X^{M1}$ represents an amino group, a hydroxyl group, a chlorine atom, or a phenoxy group substituted with a sulfo group or a carboxyl group.)

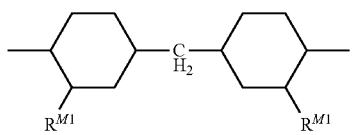

(M-1-1)

(In Formula (M-1-1), $R^{M1}$ represents a hydrogen atom or an alkyl group.)

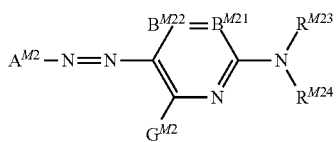

(M-2)

(In Formula (M-2), $A^{M2}$ represents a 5-membered heterocyclic group, $B^{M21}$ and $B^{M22}$ each represent —$CR^{M21}$=, —$CR^{M22}$=, or any one of $B^{M21}$ and $B^{M22}$ represents a nitrogen atom, and the other represents —$CR^{M21}$= or —$CR^{M22}$=, $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, $R^{M23}$ and $R^{M24}$ may further have a substituent, $G^{M2}$, $R^{M21}$ and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureido group, a sulfamoylamino group, an alkoxycarbonylamino group, an aryloxycarbonylamino group, alkyl and arylsulfonylamino groups, an aryloxycarbonylamino group, a nitro group, alkyl and arylthio groups, alkyl and arylsulfonyl groups, alkyl and arylsulfinyl groups, a sulfamoyl group, a sulfo group, or a heterocyclic thio group, $G^{M2}$, $R^{M21}$, and $R^{M22}$ may be further substituted, and $R^{M21}$ and $R^{M23}$, or $R^{M23}$ and $R^{M24}$ may combine to form a 5- or 6-membered ring.)

Preferably, a yellow ink contains one or more selected from the group consisting of coloring materials represented by the following Formula (Y-1).

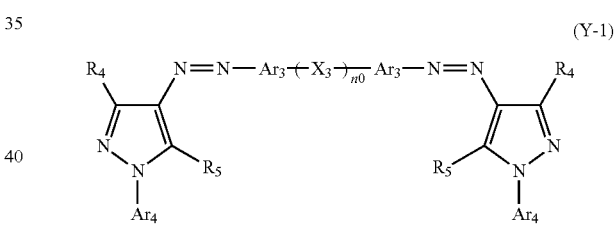

(Y-1)

(In Formula (Y-1), $R_4$ represents a substituent, $R_5$ represents —$OR_6$ or —$NHR_7$, $R_6$ and $R_7$ represent a hydrogen atom or a substituent, $X_3$ represents a divalent linking group, $n0$ is 0 or 1, $Ar_3$ represents a divalent heterocyclic group, and $Ar_4$ represents an alkyl group, an aryl group or a triazine group.)

The content of the dye is preferably 0.1% by mass or more and 25% by mass or less, more preferably 1% by mass or more and 20% by mass or less, and particularly preferably 1% by mass or more and 15% by mass or less with respect to the total mass of the dye ink. When it is less than 0.1% by mass, color developability may be inferior in some cases. When it is more than 25% by mass, solubility in water may be insufficient or clogging recoverability may be deteriorated in some cases.

The dye inks contain water similar to pigments. Water functions as a main solvent for dispersing or dissolving the above-mentioned dyes.

It is preferable that the water be obtained by removing ionic impurities as much as possible, and examples thereof include pure water or ultrapure water such as ion exchanged water, ultrafiltered water, reverse osmosis water, and distilled water. In addition, the use of water sterilized by ultraviolet irradiation or addition of hydrogen peroxide and the like is preferable because generation of fungus and bacteria can be prevented when the pigment dispersion and the ink using the pigment dispersion are stored for a long time.

The water contained in the pigment ink according to this embodiment is preferably 40% by mass or more, and more preferably 50% by mass or more with respect to the total mass of the pigment ink. In the present specification, the term "aqueous pigment ink" refers to an ink containing 40% by mass or more of water with respect to the total mass of the pigment ink.

The dye ink preferably contains a water-soluble organic solvent like the pigment ink described above. In addition, the dye ink may add other resin binders, dispersants, surfactants, viscosity adjusting agents, surface tension adjusting agents, pH adjusting agents, dye dissolving agents, antiseptic or antifungal agents, rust-preventive agent, and the like which are known in the related art as required.

2. Ink Jet Recording Apparatus

An ink jet recording apparatus according to the embodiment of the invention includes a head member. Hereinafter, an ink jet recording apparatus according to the embodiment of the invention will be described with reference to FIGS. 1 to 3. In each drawing used in the following description, the scale of each member is appropriately changed in order to make each member recognizable in size.

FIG. 1 is a perspective view showing a configuration of a printer 1 as an ink jet recording apparatus according to the embodiment. Further, the printer 1 represents a serial printer.

As shown in FIG. 1, the printer 1 includes a carriage 4 that mounts the ink jet head 2 and detachably mounts the ink cartridge 3, a platen 5 that is disposed below the ink jet head 2 and transports the recording medium 6, a carriage moving mechanism 7 for moving the carriage 4 in the medium width direction of the recording medium 6, and a medium feeding mechanism 8 for transporting the recording medium 6 in the medium transport direction. In addition, The printer 1 has a control device CONT for controlling the operation of the entire printer 1. Further, the medium width direction is the main scanning direction (a head scanning direction). The medium feeding direction is a sub scanning direction (a direction orthogonal to the main scanning direction).

The ink cartridge 3 according to the embodiment is composed of separate ink cartridges 3a, 3b, 3c and 3d. Each of the ink cartridges 3a to 3d is filled with the above-described pigment ink and dye ink. In the embodiment, the ink cartridge 3a is filled with pigment ink, the ink cartridge 3b is filled with the first dye ink, the ink cartridge 3c is filled with the second dye ink, and the ink cartridge 3d is filled with the third dye ink.

The arrangement order of the ink cartridges 3 is not particularly limited, and can be arranged in the desired order. For example, in the example of FIG. 1, the ink cartridges 3a to 3d are arranged in the order of ink cartridges 3a, 3d, 3c and 3d from one side (hereinafter, also referred to as "S1") of the main scanning direction to the other side (hereinafter, also referred to as "S2") of the main scanning direction. Further, the first dye ink, the second dye ink and the third dye ink correspond to the above-described dye inks and have different colors from each other.

In the embodiment, the number of ink cartridges is four, but the invention is not limited thereto, and the desired number of ink cartridges can be mounted.

The ink cartridge 3 may be a type that is not only mounted on the carriage 4 as in the embodiment, but may also be replaced with a type which is mounted in the cabinet of the printer 1 and is supplied to the ink jet head 2 through the ink supply tube, for example.

The carriage 4 is attached in a state of being supported by a guide rod 9 which is a support member built in the main scanning direction. Further, the carriage 4 is moved in the main scanning direction along the guide rod 9 by the carriage moving mechanism 7.

The linear encoder 10 detects the position of the carriage 4 in the main scanning direction as a signal. The detected signal is transmitted to the control device CONT as position information. The control device CONT recognizes the scanning position of the ink jet head 2 based on the position information from the linear encoder 10 and controls the recording operation (jetting operation) and the like by the ink jet head 2. Further, the control device CONT has a configuration capable of variably controlling the moving speed of the carriage 4.

FIG. 2 is a schematic diagram showing a nozzle surface 21a of the ink jet head 2 according to the embodiment. As shown in FIG. 2, the ink jet head 2 has a nozzle surface 21a. A plurality of nozzle rows 16 is arranged on a nozzle surface 21a which is also an ink ejection surface. The plurality of nozzle rows 16 is constituted by a plurality of nozzle holes 21b for jetting the ink for each nozzle row.

The plurality of nozzle rows 16 can jet the ink of different composition, for example, for each nozzle row. In the example of FIG. 2, the nozzle row corresponds to the composition of ink and four rows are formed, and each nozzle row is arranged along the main scanning direction. Specifically, it includes a nozzle row 16A capable of jetting the pigment ink, a nozzle row 16B capable of jetting the first dye ink, a nozzle row 16C capable of jetting the second dye ink, and a nozzle row 16D capable of jetting the third dye ink.

In the example of FIG. 2, each of the nozzle rows 16A to 16D extends in a direction orthogonal to the main scanning direction on the nozzle surface 21, but the invention is not limited to this. Each of them may be disposed to be given an angle in a direction orthogonal to the main scanning direction in the nozzle surface 21.

In order to change the type of ink to be jetted for each nozzle row, for example, the arrangement order of the ink cartridges 3a to 3d may be changed.

A plurality of nozzle holes 21b is arranged in a predetermined pattern to form a nozzle row. In this embodiment, the nozzle holes 21b are disposed in parallel along the direction orthogonal to the main scanning direction of the nozzle surface 21a, but the invention is not limited thereto. For example, they may be disposed in a zigzag shape along the direction orthogonal to the main scanning direction of the nozzle surface 21a. Further, the number of the nozzle holes 21b constituting the nozzle row is not specifically limited.

A home position serving as a scanning start point of the ink jet head 2 is set in an area outside the platen 5 in the movement range of the ink jet head 2. In this home position, a maintenance unit 11 including a cap member 12 and a wiping member 13 is provided.

The maintenance unit 11 performs a moisturizing operation for capping the ink jet head 2 with the cap member 12 to suppress the evaporation of the ink other than the printing operation, a flushing operation of preventing the clogging of the nozzle hole 21b by the thickened ink, adjusting the meniscus of the nozzle hole 21b so as to jet the ink normally from the ink jet head 2 by preliminarily jetting the ink from each of the nozzle holes 21b of the ink jet head 2 to the cap member 12, a suction operation (head cleaning) of driving a suction pump (not shown) after capping the ink jet head 2 with the cap member 12, forcibly sucking the ink having increased viscosity and dirt attached thereto from each nozzle hole 21b and adhering dust from each nozzle hole 21b to adjust the meniscus, and jetting the ink normally from the ink jet head 2, and a wiping operation for performing a purging process for destroying the meniscus of the nozzle hole 21b to readjust the meniscus by sweeping (wiping) the nozzle surface 21a (see FIG. 2) of the ink jet head 2 with the wiping member 13 so as to remove the ink adhered in the vicinity of the nozzle hole 21b or the thickened ink and the like.

In the example of FIG. 1, the wiping member 13 is installed on the printing area side in the area where the maintenance unit 11 is provided. Further, as shown in FIG. 2, the wiping member 13 is disposed in parallel with the nozzle rows 16A to 16D on the nozzle surface 21a. In the ink set of the invention, pigment agglomeration is not caused by mixing the pigment ink and the dye ink. Therefore, the arrangement of the wiping member 13 is not limited, and it may be parallel or orthogonal to the nozzle rows 16A to 16D. More preferably, a parallel arrangement is preferred. Since the nozzle surface 21a can be wiped only by the operation of the carriage 4 and the structure of the maintenance unit is simplified, downsizing and cost reduction can be realized.

FIG. 3 is a diagram showing the arrangement of the nozzle surface 21a and the cap member 12 of the ink jet head 2 in the suction operation. The cap member 12 includes a cap body 12a, an ink absorbing material 12b, and a waste ink suction port 12c. As shown in FIG. 3, when the interval between the nozzle row 16A of the pigment ink and the nozzle row 16B of the dye ink is A µm and the distance between the nozzle surface 21a and the ink absorbing material 12b at the time of suction is B µm, the relation thereof satisfies A>B. More specifically, the distance B represents the distance between the position of the absorbing material and the nozzle surface when a part of the ink droplets leaking from the nozzle comes into contact with the ink absorbing material when capping the ink jet head with the cap member.

According to the configuration shown in FIG. 3, since the nozzle row 16A of the pigment ink and the nozzle row 16B of the dye ink are disposed close to each other, the pigment ink and the dye ink are mixed on the nozzle surface before the ink on the nozzle surface 21a is absorbed by the ink absorbing material 12b at the time of suction by the cap member 12. According to this embodiment, since the potassium ion concentration of each dye ink is specified to 50 ppm, even when the pigment ink of the nozzle row 16A and the dye ink of the adjacent nozzle row 16B are mixed on the nozzle surface, agglomeration of the pigment can be suppressed. Accordingly, it is possible to provide an ink jet recording apparatus capable of suppressing clogging with a simple maintenance unit even if the nozzle rows are highly integrated.

Modified Example

FIG. 4 is a schematic view showing another example of the nozzle surface of the ink jet head 2 according to an embodiment of the invention. A plurality of nozzle rows 116 is arranged on the nozzle surface 21a. In the example of FIG. 4, the plurality of nozzle rows 116 is composed of a nozzle row 116A for jetting the pigment ink and a nozzle row 116B for jetting the dye ink. The number of nozzle rows is not limited to two, and the nozzle rows may be further provided.

The nozzle row 116B is use by being divided into a plurality of groups including a predetermined number of nozzle holes 21b along a direction in which the nozzle holes 21b are arranged (hereinafter, also referred to as "direction B") in order to jet the dye ink of different colors. The direction B may also be orthogonal to the main scanning direction of the nozzle surface 21a.

In the example of FIG. 4, the nozzle rows 116B are divided into groups each having six nozzle holes 21b, and include a first group 116a, a second group 116b, and a third group 116c. The number of the nozzle holes 21b constituting one group is not particularly limited. Further, the number of the nozzle holes 21b constituting the group may be the same or different for each group.

Although not shown, the ink cartridges are disposed so that the first dye, the second dye, and the third dye can be respectively jetted from the first group 116a, the second group 116b, and the third group 116c.

In the example of FIG. 4, the nozzle rows 116A and 116B extend in a direction orthogonal to the main scanning direction on the nozzle surface 21a, respectively, but the invention is not limited thereto. The nozzle rows 116A and 116B may be disposed at an angle given in a direction orthogonal to the main scanning direction on the nozzle surface 21a.

In this embodiment, the wiping member 13 is disposed on the upstream side of the sub scanning direction in the area (home position) where the maintenance unit is provided (see FIG. 1). Further, as shown in FIG. 4, the wiping member 13 is disposed along the arrangement direction (the main scanning direction of the nozzle surface 21a) of the nozzle rows 116A and 116B in the nozzle surface 21a.

In the case of the nozzle arrangement shown in FIG. 4, the pigment ink of the nozzle row 116A and each dye ink of the nozzle rows 116B adjacent thereto are mixed on the nozzle surface before the ink on the nozzle surface 21a is absorbed to the ink absorbing material 12b at the time of suction by the cap member 12. According to this embodiment, since the potassium ion concentration of each dye ink is specified to 50 ppm, agglomeration of the pigment can be suppressed even when the pigment ink of the nozzle row 116A and each dye ink of the nozzle rows 116B are mixed on the nozzle surface. Therefore, it is possible to provide an ink jet recording apparatus capable of suppressing clogging with a simple maintenance unit even if the nozzle rows are highly integrated.

3. Example

Hereinafter, the invention will be described in more detail with reference to Examples and Comparative Examples, but the invention is not limited to these Examples.

Materials for Inks

The main materials of the inks used in the following Examples and Comparative Examples are as follows.

Coloring Material

Bk pigment A: BONJET BLACK CW-2 (Self-dispersion type Bk pigment manufactured by Orient Corporation; pigment content of 15%)

Bk pigment B: CAB-O-JET 300 (self-dispersion type Bk pigment manufactured by Cabot Corporation; pigment content of 15%)

DC-1: A mixture of a dye corresponding to C-1 and a dye corresponding to C-2
DB199: C.I. Direct Blue 199
DC-2: Dye corresponding to C-2
RR141: C.I. Reactive Red 141
DM-1: Dye corresponding to M-1
DM-2: Dye corresponding to M-2
DR227: C.I. Direct Red 227
DY86: D.I. Direct Yellow 86
DY-1: Dye corresponding to Y-1
DY-2: Dye in which the counter ion of the dye DY-1 is substituted Surfactant
  Olfine E1010 (which is manufactured by Nissin Chemical Industry Co., Ltd; acetylene glycol-based surfactant)
Solvent
  Triethylene glycol monobutyl ether
  Glycerin
  Triethylene glycol
  pH adjusting agent
  Triethanolamine
Chemical Formula of Dye Used
  The chemical formulae of the above-mentioned dyes DC-1, DC-2, DM-1, DM-2, DY-1 and DY-2 are summarized below.

DC-1

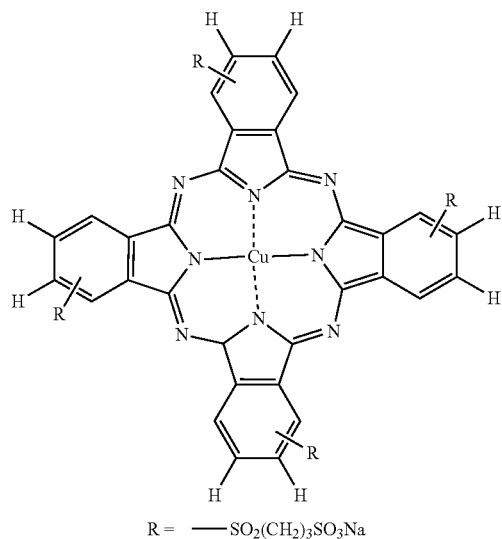

R = —SO$_2$(CH$_2$)$_3$SO$_3$Na

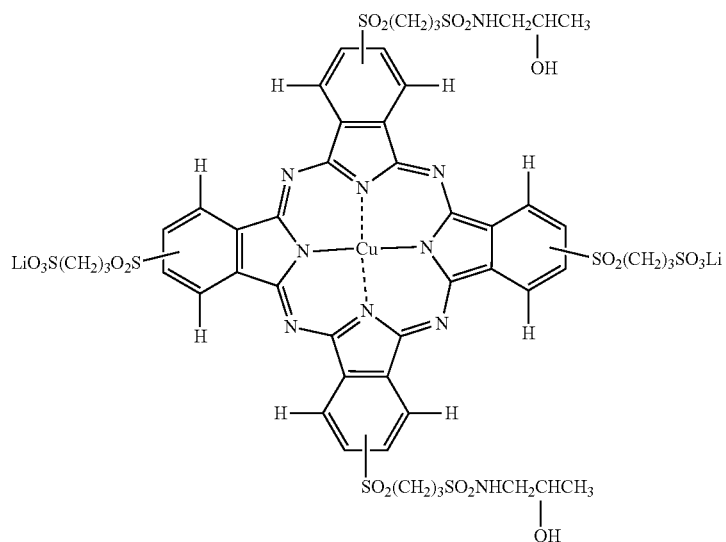

-continued
DC-2
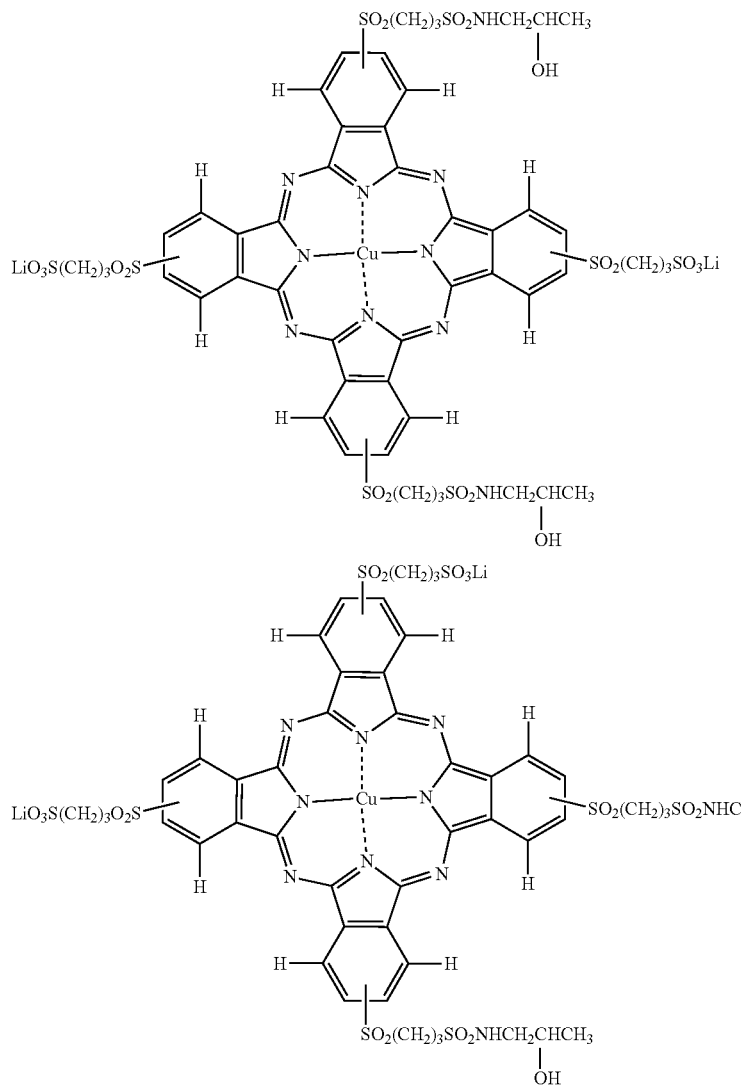
DM-1
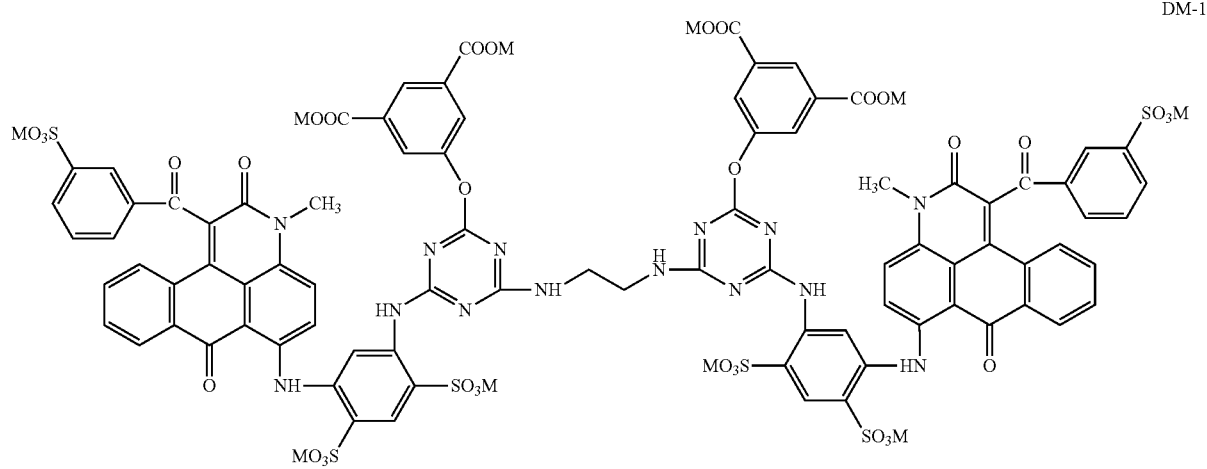
M = Na or NH₄

-continued

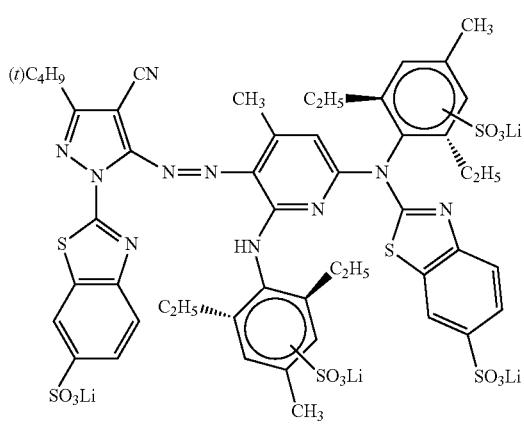

DM-2

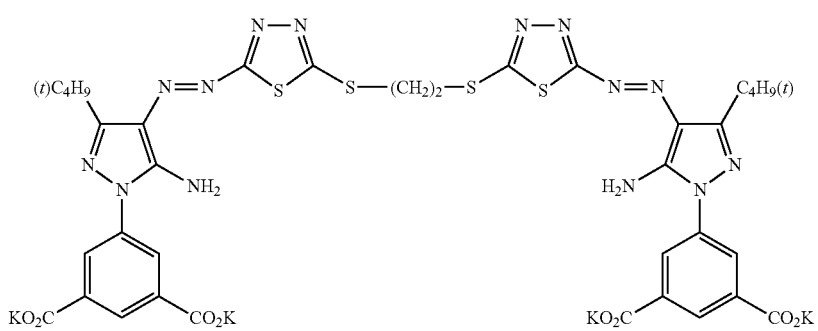

DY-1

Preparation of Ink

Each material was mixed in the composition shown in the following Table 1 and sufficiently stirred to obtain each ink. Specifically, each material was homogeneously mixed, and insoluble matter was removed with a filter having a pore size of 0.6 μm to prepare each ink. In the following Table 1, the unit of the numerical value was % by mass, and the total was 100.0% by mass. The lithium ion concentration, the sodium ion concentration, the potassium ion concentration, and the divalent ion concentration were measured under the following conditions using an ion chromatograph manufactured by Shimadzu Corporation. Each ion concentration in the ink was determined from a calibration curve obtained using the solution having a known concentration.

Here, copper ions, zinc ions, calcium ions, and magnesium ions were detected as divalent ions, and other divalent ions were not detected. Therefore, the total concentration of divalent ions represents the sum of copper ion concentration, zinc ion concentration, calcium ion concentration, and magnesium ion concentration.

Column used: Ion exchange resin (Shim-pack IC-C4) manufactured by Shimadzu Corporation
Mobile phase: Oxalic acid solution (2.5 mmol/L)
Flow rate: 1.0 mL/min
Sample injection amount: 50 μL
Column temperature: 40° C.
Suppressor: electrodialysis type
Detector: Electrical Conductivity Detector (30° C.)

TABLE 1

| | Ink | K-1 | K-2 | C-1 | C-2 | C-3 | C-4 | M-1 | M-2 |
|---|---|---|---|---|---|---|---|---|---|
| Pigment | Bk pigment A | 2.60 | | | | | | | |
| | Bk pigment B | | 2.00 | | | | | | |
| Dye | C-1 | | | | 4.00 | | | | |
| | C-2 | | | | | 4.00 | | | |
| | DB199 | | | 4.00 | | | 1.00 | | |
| | RR141 | | | | | | | 4.00 | |
| | M-1 | | | | | | | | |
| | M-2 | | | | | | | | 4.00 |
| | DR227 | | | | | | | | |
| | DY86 | | | | | | | | |
| | Y-1 | | | | | | | | |
| | Y-2 | | | | | | | | |
| Water-soluble organic | Olfine E1010 | 1.00 | 1.00 | 0.50 | 0.50 | 0.50 | 0.50 | 0.50 | 0.50 |
| | Triethylene glycol monobutyl ether | 2.10 | 2.10 | 10.00 | 10.00 | 10.00 | 10.00 | 10.00 | 10.00 |

TABLE 1-continued

| | | | | | | | | | |
|---|---|---|---|---|---|---|---|---|---|
| solvent | Glycerin | 2.09 | 2.09 | 11.00 | 10.00 | 10.00 | 10.00 | 10.00 | 10.00 |
| | Triethylene glycol | 2.00 | 2.00 | 8.00 | 8.00 | 8.00 | 8.00 | 8.00 | 8.00 |
| | Triethanolamine | 0.50 | 0.50 | 0.30 | 0.30 | 0.30 | 0.30 | 0.30 | 0.30 |
| Water | ultrapure water | Balance | Balance | Balance | Balance | Balance | Balance | Balance | Balance |
| | Sum | 100.00 | 100.00 | 100.00 | 100.00 | 100.00 | 100.00 | 100.00 | 100.00 |
| | Li ions [ppm] | 0 | 0 | 0 | 420 | 0 | 0 | 0 | 5 |
| | Na ions [ppm] | 33 | 28 | 2000 | 510 | 900 | 240 | 4000 | 90 |
| | K ions [ppm] | 130 | 100 | 35 | 0 | 0 | 45 | 45 | 0 |
| | Sum of Li ions, Na ions and K ions [ppm] | 163 | 128 | 2035 | 930 | 900 | 285 | 4045 | 95 |
| | Sum of Li ions and Na ions [ppm] | 33 | 28 | 2000 | 930 | 900 | 240 | 4000 | 95 |
| | Sum of divalent ions [ppm] | 12 | 9 | 0 | 0 | 0 | 0 | 0 | 0 |

| | Ink | M-3 | M-4 | M-5 | M-6 | Y-1 | Y-2 | Y-3 | Y-4 |
|---|---|---|---|---|---|---|---|---|---|
| Pigment | Bk pigment A | | | | | | | | |
| | Bk pigment B | | | | | | | | |
| Dye | C-1 | | | | | | | | |
| | C-2 | | | | | | | | |
| | DB199 | | | | | | | | |
| | RR141 | | | | | | | | |
| | M-1 | 4.00 | | 4.00 | | | | | |
| | M-2 | | 4.00 | | | | | | |
| | DR227 | | | | 3.00 | | | | |
| | DY86 | | | | | 4.00 | | | 3.00 |
| | Y-1 | | | | | | 4.00 | | |
| | Y-2 | | | | | | | 4.00 | |
| Water-soluble organic solvent | Olfine E1010 | 0.50 | 0.50 | 0.50 | 0.50 | 0.50 | 0.50 | 0.50 | 0.50 |
| | Triethylene glycol monobutyl ether | 10.00 | 10.00 | 10.00 | 10.00 | 10.00 | 10.00 | 10.00 | 10.00 |
| | Glycerin | 10.00 | 10.00 | 10.00 | 10.00 | 10.00 | 10.00 | 10.00 | 10.00 |
| | Triethylene glycol | 8.00 | 8.00 | 8.00 | 8.00 | 8.00 | 8.00 | 8.00 | 8.00 |
| | Triethanolamine | 0.30 | 0.30 | 0.30 | 0.30 | 0.30 | 0.30 | 0.30 | 0.30 |
| Water | ultrapure water | Balance | Balance | Balance | Balance | Balance | Balance | Balance | Balance |
| | Sum | 100.00 | 100.00 | 100.00 | 100.00 | 100.00 | 100.00 | 100.00 | 100.00 |
| | Li ions [ppm] | 0 | 5 | 0 | 1 | 350 | 0 | 0 | 0 |
| | Na ions [ppm] | 1650 | 5 | 1400 | 1500 | 2200 | 1800 | 500 | 900 |
| | K ions [ppm] | 0 | 86 | 170 | 2 | 30 | 0 | 1200 | 450 |
| | Sum of Li ions, Na ions and K ions [ppm] | 1650 | 96 | 1570 | 1503 | 2580 | 1800 | 1700 | 1350 |
| | Sum of Li ions and Na ions [ppm] | 1650 | 10 | 1400 | 1501 | 2550 | 1800 | 500 | 900 |
| | Sum of divalent ions [ppm] | 25 | 0 | 25 | 0.8 | 0 | 0 | 0 | 0 |

Manufacture of Ink Set

Each of the inks obtained as described above was used as an ink set in the combination shown in Table 2. The ink set of Comparative Example 3 corresponds to the ink set proposed in JP-A-2004-339284 or JP-A-2004-346160.

TABLE 2

| | Composition | | | | Conditions | | Performance | | | | | |
|---|---|---|---|---|---|---|---|---|---|---|---|---|
| | K | C | M | Y | Head | Maintenance Unit | Bk Color Developability | Col Color Developability | Clogging Recoverability | Agglomerative Property | Jetting Stability | Ozone Resistance |
| Example 1 | K-1 | C-1 | M-1 | Y-1 | Narrow Pitch | Simple | A | A | A | A | A | B |
| Example 2 | K-1 | C-1 | M-1 | Y-2 | Narrow Pitch | Simple | A | A | A | A | A | B |
| Example 3 | K-1 | C-2 | M-1 | Y-1 | Narrow Pitch | Simple | A | A | A | A | A | B |
| Example 4 | K-1 | C-2 | M-1 | Y-2 | Narrow Pitch | Simple | A | A | A | A | A | B |
| Example 5 | K-1 | C-2 | M-2 | Y-1 | Narrow Pitch | Simple | A | B | A | A | A | A |
| Example 6 | K-1 | C-2 | M-2 | Y-2 | Narrow Pitch | Simple | A | B | A | A | A | A |

TABLE 2-continued

|  | Composition | | | | | Conditions | | Performance | | | | | |
|---|---|---|---|---|---|---|---|---|---|---|---|---|---|
|  | K | C | M | Y | Head | Maintenance Unit | Bk Color Developability | Col Color Developability | Clogging Recoverability | Agglomerative Property | Jetting Stability | Ozone Resistance |
| Example 7 | K-1 | C-2 | M-3 | Y-1 | Narrow Pitch | Simple | A | A | A | A | A | A |
| Example 8 | K-1 | C-2 | M-3 | Y-2 | Narrow Pitch | Simple | A | A | A | A | A | A |
| Comparative Example 1 | K-2 | C-3 | M-4 | Y-3 | Narrow Pitch | Simple | C | B | C | D | D | A |
| Comparative Example 2 | K-1 | C-3 | M-5 | Y-3 | Narrow Pitch | Simple | A | B | C | D | D | A |
| Comparative Example 3 | K-2 | C-4 | M-6 | Y-4 | Narrow Pitch | Simple | C | B | C | D | D | B |
| Comparative Example 4 | K-1 | C-2 | M-4 | Y-2 | Narrow Pitch | Simple | A | B | A | D | D | A |

Evaluation of Ink Set

The ink sets of Examples and Comparative Examples shown in Table 2 were evaluated according to the following evaluation items. Evaluation was made using PX-M650F (which is manufactured by Seiko Epson Corporation) as an ink jet recording apparatus for jetting the ink sets. As the ink head mounted on the printer, a head having an interval of a narrow pitch (1 mm) between the nozzle rows of the pigment ink and the dye ink was used. As the maintenance unit mounted on the printer, a simple maintenance unit (including a cleaning system) corresponding to a pair of a cap member and a wiper member to match the dye ink and the pigment ink was used. The distance between the nozzle surface and the ink absorbing material at the time of capping was 0.8 mm.

Evaluation of Color Developability (Bk)

Each black ink in Table 1 was subjected to solid printing with a size of 50 mm×50 mm on Xerox P (copy paper manufactured by Fuji Xerox Co., Ltd.; trade name) at an injection amount of 2 mg/cm2. Thereafter, it was dried at 25° C. for 24 hours. The OD value of the obtained printed matter was measured with Spectrolino (which is manufactured by Gretag Macbeth; trade name). The obtained OD value was evaluated according to the following criteria.

Evaluation Criteria

A: OD value was 1.4 or more
B: OD value was 1.2 or more and less than 1.4
C: OD value was less than 1.2

Evaluation of Color Developability (Col)

PX-M 650F (which is manufactured by Seiko Epson Corporation) was filled with each cyan ink shown in Table 1 and the ink subjected to solid printing of 50 mm×50 mm on EPSON photographic paper <gloss> (which is manufactured by Seiko Epson Corporation; trade name) at an injection amount of 2 mg/cm2. Thereafter, it was dried at 25° C. for 24 hours. The OD value of the obtained printed matter was measured with Spectrolino (which is manufactured by Gretag Macbeth; trade name). Likewise, the magenta ink and the yellow ink were also printed, and the OD value was similarly measured. The obtained OD value was evaluated according to the following criteria.

Evaluation Criteria

A: All OD values of cyan ink, magenta ink, and yellow ink were 2.2 or more
B: Any one of OD values of cyan ink, magenta ink, and yellow ink was less than 2.2
C: All OD values of cyan ink, magenta ink, and yellow ink were less than 2.2

Evaluation of Clogging Recoverability

PX-405A (which is manufactured by Seiko Epson Corporation) was filled with the ink compositions of the respective Examples and Comparative Examples, and left to stand at 40° C. for a week, and then the clogging recoverability was evaluated according to the following criteria. In addition, since clogging defects may sometimes occur due to agglomeration of pigments by wiping in the cleaning, the evaluation was performed here without performing any wiping operation.

Evaluation Criteria

A: No clogging nozzle at third cleaning
B: No clogging nozzle at sixth cleaning
C: Clogging nozzle at sixth cleaning Evaluation of Agglomerative Property Each of the ink sets shown in Table 2 was evaluated for agglomerative property when mixing the black ink with the color inks of cyan ink, magenta ink, and yellow ink. One droplet was dropped on the glass plate so as to contact with the black ink and the cyan ink. After 30 minutes, the portion where the ink contacted was observed with an optical microscope at 30 times magnification. Likewise, the magenta ink and the yellow ink were observed and evaluated according to the following criteria.

Evaluation Criteria

A: No agglomerates of black pigments were observed in all of the cyan ink, the magenta ink, and the yellow ink.
D: Agglomerates of black pigments were observed in any one of cyan ink, magenta ink, and yellow ink.

Evaluation of Jetting Stability

PX-M650F (which is manufactured by Seiko Epson Corporation) was filled with each ink set shown in Table 2, and a nozzle check pattern is printed to confirm that the total nozzles were normally jetted. Thereafter, after head cleaning was performed once, it was left to stand at room temperature for 30 minutes as it is. In addition, the number of missing nozzles when the nozzle check pattern was printed was observed. This series of operations were carried out three times, and the average number of missing nozzles of three times was calculated, and determined according to the following criteria. In addition, since the wiping operation for wiping the nozzle surface with the wiper members was included in the head cleaning operation of the printer, the pigment ink and the dye ink were mixed.

Evaluation Criteria

A: The average number of missing nozzles was less than 5.

D: The average number of missing nozzles was 5 or more.

Evaluation of Ozone Resistance

PX-M650F (which is manufactured by Seiko Epson Corporation) was filled with each ink set shown in Table 2, and the cyan ink, the magenta ink, and the yellow ink were applied to EPSON photographic paper <gloss> (which is manufactured by Seiko Epson Corporation; trade name). A solid image of each color adjusted to have an OD value of 0.9 to 1.1 was printed to prepare a recorded matter. The OD value (D0) of the obtained recorded matter was measured using Spectrolino (trade name: manufactured by Gretag Macbeth). Thereafter, the recorded matter was exposed for 15 hours under conditions of a temperature of 23° C., a humidity of 50% RH and an ozone concentration of 5 ppm using an ozone weather meter (trade name: OMS-L, manufactured by Suga Test Instruments Co., Ltd.). The OD value (D) of the recorded matter after exposure was measured using Spectrolino (trade name: manufactured by Gretag Macbeth), the optical density residual ratio (ROD) of each color was determined by the following equation, and the difference between the maximum ROD and the minimum ROD was determined. The ozone resistance was evaluated according to the following criteria.

ROD (%)=(D/D0)×100

Measurement conditions: No light source filter, Light source: D50, Viewing angle: 2°

The obtained evaluation represents that the ink set having a small difference between the maximum ROD and the minimum ROD shows less color change due to exposure to ozone, which was excellent.

Evaluation Criteria

A: The difference between the maximum ROD and the minimum ROD was 15% or less

B: The difference between the maximum ROD and the minimum ROD was more than 15% and 30% or less D: The difference between the maximum ROD and the minimum ROD was more than 30%

As shown in Table 2, the ink sets of Examples 1 to 4 were highly evaluated for clogging, color developability, printing stability (jetting stability accompanied by cleaning operation). In contrast, in the ink sets of Comparative Examples 1 and 2, agglomeration of the pigments was likely to occur due to a mixing of the pigment ink and the dye ink, and the printing stability (jetting stability accompanied by the cleaning operation) was evaluated to be low. In addition, Comparative Example 3 resulted in inferior color developability.

This application claims priority to Japanese Patent Application No. 2016-130866 filed on Jun. 30, 2016. The entire disclosure of Japanese Patent Application No. 2016-130866 is hereby incorporated herein by reference.

What is claimed is:

1. An aqueous ink set for ink jet recording comprising:
an aqueous pigment ink containing water and a pigment as a coloring agent; and
an aqueous dye ink containing water and a dye as a coloring agent,
wherein the concentration of the divalent metal ions of the pigment ink is 10 ppm or more, and
the potassium ion concentration of the dye ink is 50 ppm or less.

2. The aqueous ink set for ink jet recording according to claim 1, in which a total concentration of lithium ions and sodium ions of the dye ink is 600 ppm or more.

3. The aqueous ink set for ink jet recording according to claim 1, further comprising:
a yellow ink;
a magenta ink;
a cyan ink; and
a black ink,
wherein the black ink is composed of the pigment ink, and the yellow ink, the magenta ink and the cyan ink are composed of the dye ink.

4. The aqueous ink set for ink jet recording according to claim 3,
wherein the cyan ink contains one or more selected from the group having coloring materials represented by the following Formula (C-1) and the following Formula (C-2),

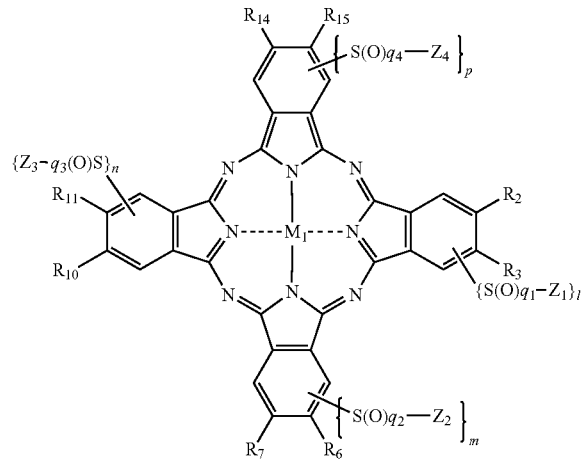

(In Formula (C-1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group or an ionic hydrophilic group, These groups may further have a substituent, $Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, Provided that at least one of $Z_1$, $Z_2$, $Z_3$ and $Z_4$ has an ionic hydrophilic group as a substituent, l, m, n, p, $q_1$, $q_2$, $q_3$ and $q_4$ each independently represent 1 or 2, $M_1$ represents a hydrogen atom, a metal element, a metal oxide, a metal hydroxide or a metal halide,)

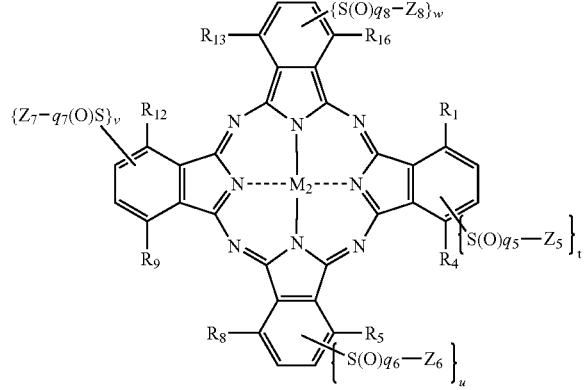

(C-2)

(In Formula (C-2), $R_1$, $R_4$, $R_5$, $R_8$, $R_9$, $R_{12}$, $R_{13}$ and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group or an ionic hydrophilic group, These groups may further have a substituent, $Z_5$, $Z_6$, $Z_7$ and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, Provided that at least one of $Z_5$, $Z_6$, $Z_7$ and $Z_8$ has an ionic hydrophilic group as a substituent, t, u, v, w, $q_5$, $q_6$, $q_7$ and $q_8$ each independently represent 1 or 2, $M_2$ represents a hydrogen atom, a metal element, a metal oxide, a metal hydroxide or a metal halide).

5. The aqueous ink set for ink jet recording according to claim 3, wherein the magenta ink contains one or more selected from the group having coloring materials represented by the following Formula (M-1) and the following Formula (M-2),

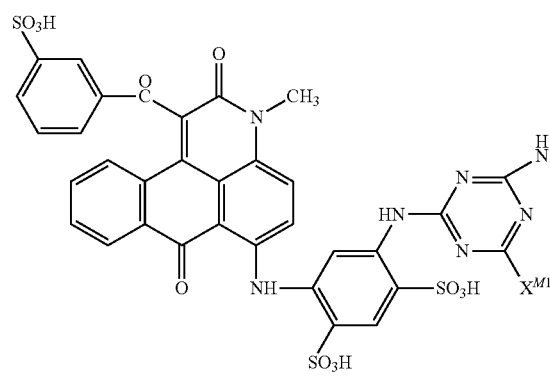
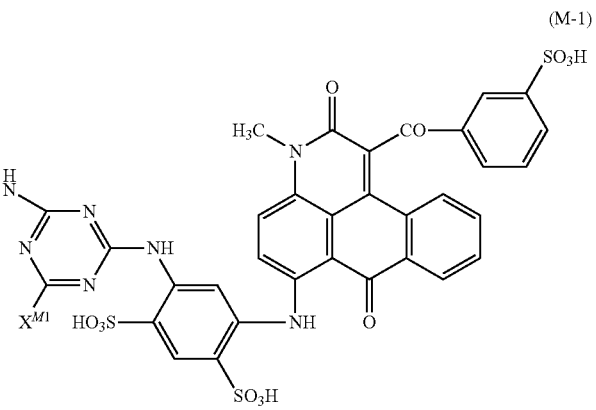

(M-1)

(In Formula (M-1), $A^{M1}$ represents an alkylene group having 1 or 2 carbon atoms, an alkylene group having 1 or 2 carbon atoms and containing a phenylene group or a group represented by the following Formula (M-1-1), and $X^{M1}$ represents an amino group, a hydroxyl group, a chlorine atom, or a phenoxy group substituted with a sulfo group or a carboxyl group)

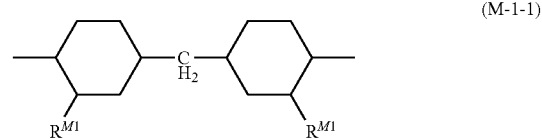

(M-1-1)

(In Formula (M-1-1), $R^{M1}$ represents a hydrogen atom or an alkyl group)

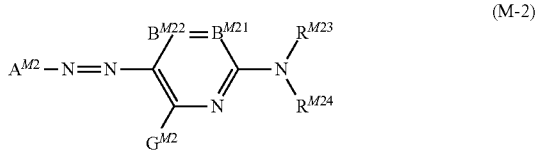

(In Formula (M-2), $A^{M2}$ represents a 5-membered heterocyclic group, $B^{M21}$ and $B^{M22}$ each represent $—CR^{M21}=$, $—CR^{M22}=$, or any one of $B^{M21}$ and $B^{M22}$ represents a nitrogen atom, and the other represents $—CR^{M21}=$ or $—CR^{M22}=$, $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, $R^{M23}$, $R^{M24}$ may further have a substituent, $G^{M2}$, $R^{M21}$ and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group or a heterocyclic group, an acylamino group, a ureido group, a sulfamoylamino group, an alkoxycarbonylamino group, an aryloxycarbonylamino group, alkyl and arylsulfonylamino groups, an aryloxycarbonylamino group, a nitro group, alkyl and arylthio groups, alkyl and arylsulfonyl groups, alkyl and arylsulfinyl groups, a sulfamoyl group, a sulfo group, or a heterocyclic thio group, $G^{M2}$, $R^{M21}$, and $R^{M22}$ may be further substituted, and $R^{M21}$ and $R^{M23}$, or $R^{M23}$ and $R^{M24}$ may combine to form a 5- or 6-membered ring).

6. The aqueous ink set for ink jet recording according to claim 3,
wherein the yellow ink contains one or more selected from the group having coloring materials represented by the following Formula (Y-1),

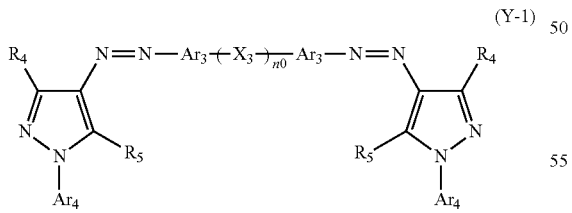

(In Formula (Y-1), $R_4$ represents a substituent, $R_5$ represents $—OR_6$ or $—NHR_7$, $R_6$ and $R_7$ represent a hydrogen atom or a substituent, $X_3$ represents a divalent linking group, n0 is 0 or 1, $Ar_3$ represents a divalent heterocyclic group, and $Ar_4$ represents an alkyl group, an aryl group or a triazine group).

7. A recording method in which recording is performed by jetting the pigment ink and the dye ink according to claim 1, from a nozzle.

8. A recording method in which recording is performed by jetting the pigment ink and the dye ink according to claim 2, from a nozzle.

9. A recording method in which recording is performed by jetting the pigment ink and the dye ink according to claim 3, from a nozzle.

10. A recording method in which recording is performed by jetting the pigment ink and the dye ink according to claim 4, from a nozzle.

11. A recording method in which recording is performed by jetting the pigment ink and the dye ink according to claim 5, from a nozzle.

12. A recording method in which recording is performed by jetting the pigment ink and the dye ink according to claim 6, from a nozzle.

13. An ink jet recording apparatus comprising:
an ink set containing the pigment ink and the dye ink according to claim 1;
a nozzle surface provided with each of nozzle rows for jetting the pigment ink and the dye ink; and
a cap member disposed close to the nozzle surface at the time of suction and having an ink absorbing material for sucking the ink from the nozzle row,
wherein when the interval between the nozzle row of the pigment ink and the nozzle row of the dye ink is A μm, and the distance between the nozzle surface and the ink absorbing material at the time of suction is B μm, the relation thereof satisfies A>B.

14. An ink jet recording apparatus comprising:
an ink set containing the pigment ink and the dye ink according to claim 2;
a nozzle surface provided with each of nozzle rows for jetting the pigment ink and the dye ink; and
a cap member disposed close to the nozzle surface at the time of suction and having an ink absorbing material for sucking the ink from the nozzle row,
wherein when the interval between the nozzle row of the pigment ink and the nozzle row of the dye ink is A μm, and the distance between the nozzle surface and the ink absorbing material at the time of suction is B μm, the relation thereof satisfies A>B.

15. An ink jet recording apparatus comprising:
an ink set containing the pigment ink and the dye ink according to claim 3;
a nozzle surface provided with each of nozzle rows for jetting the pigment ink and the dye ink; and
a cap member disposed close to the nozzle surface at the time of suction and having an ink absorbing material for sucking the ink from the nozzle row,
wherein when the interval between the nozzle row of the pigment ink and the nozzle row of the dye ink is A μm, and the distance between the nozzle surface and the ink absorbing material at the time of suction is B μm, the relation thereof satisfies A>B.

16. An ink jet recording apparatus comprising:
an ink set containing the pigment ink and the dye ink according to claim 4;
a nozzle surface provided with each of nozzle rows for jetting the pigment ink and the dye ink; and
a cap member disposed close to the nozzle surface at the time of suction and having an ink absorbing material for sucking the ink from the nozzle row,
wherein when the interval between the nozzle row of the pigment ink and the nozzle row of the dye ink is A μm, and the distance between the nozzle surface and the ink absorbing material at the time of suction is B μm, the relation thereof satisfies A>B.

17. An ink jet recording apparatus comprising:
an ink set containing the pigment ink and the dye ink according to claim 5;
a nozzle surface provided with each of nozzle rows for jetting the pigment ink and the dye ink; and
a cap member disposed close to the nozzle surface at the time of suction and having an ink absorbing material for sucking the ink from the nozzle row,
wherein when the interval between the nozzle row of the pigment ink and the nozzle row of the dye ink is A μm, and the distance between the nozzle surface and the ink absorbing material at the time of suction is B μm, the relation thereof satisfies A>B.

18. An ink jet recording apparatus comprising:
an ink set containing the pigment ink and the dye ink according to claim 6;
a nozzle surface provided with each of nozzle rows for jetting the pigment ink and the dye ink; and
a cap member disposed close to the nozzle surface at the time of suction and having an ink absorbing material for sucking the ink from the nozzle row,
wherein when the interval between the nozzle row of the pigment ink and the nozzle row of the dye ink is A μm, and the distance between the nozzle surface and the ink absorbing material at the time of suction is B μm, the relation thereof satisfies A>B.

* * * * *